(12) United States Patent
Xiong et al.

(10) Patent No.: US 10,632,627 B2
(45) Date of Patent: Apr. 28, 2020

(54) SERVO ASSEMBLY, ROBOT JOINT AND ROBOT

(71) Applicant: UBTECH Robotics Corp, Shenzhen (CN)

(72) Inventors: Youjun Xiong, Shenzhen (CN); Youpeng Li, Shenzhen (CN); Jing Shi, Shenzhen (CN); Hongyu Ding, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 203 days.

(21) Appl. No.: 15/904,427

(22) Filed: Feb. 26, 2018

(65) Prior Publication Data

US 2019/0184581 A1    Jun. 20, 2019

(30) Foreign Application Priority Data

Dec. 18, 2017   (CN) .......................... 2017 1 1365286

(51) Int. Cl.
| | |
|---|---|
| *B25J 17/02* | (2006.01) |
| *B25J 9/00* | (2006.01) |
| *B25J 9/10* | (2006.01) |
| *B25J 9/16* | (2006.01) |
| *B25J 9/08* | (2006.01) |
| *B25J 9/12* | (2006.01) |
| *B25J 9/04* | (2006.01) |

(52) U.S. Cl.
CPC ......... *B25J 17/0266* (2013.01); *B25J 9/0021* (2013.01); *B25J 9/08* (2013.01); *B25J 9/1025* (2013.01); *B25J 9/1635* (2013.01); *B25J 17/0258* (2013.01); *B25J 9/042* (2013.01); *B25J 9/126* (2013.01); *G05B 2219/42062* (2013.01)

(58) Field of Classification Search
CPC ........ B25J 17/0266; B25J 9/0021; B25J 9/08; B25J 9/1025; B25J 9/1635; B25J 17/0258; B25J 9/042; B25J 9/126; G05B 2219/42062

See application file for complete search history.

(56) References Cited

U.S. PATENT DOCUMENTS

| | | | | |
|---|---|---|---|---|
| 4,678,952 A | * | 7/1987 | Peterson ................ | B25J 9/1025 310/83 |
| 5,293,107 A | * | 3/1994 | Akeel ........................ | B25J 9/08 310/83 |

(Continued)

*Primary Examiner* — Zakaria Elahmadi

(57) ABSTRACT

A servo assembly includes a first speed reducer, a first motor, a first connecting member, a first control circuit board, a second speed reducer, a second motor, a second connecting member and a second control circuit board. The first control circuit board is electrically coupled to the first motor, and the second control circuit board is electrically coupled to the second motor. The output component of the first speed reducer and the first connecting member are coaxial and arranged along a first direction, and the output component of the second speed reducer and the second connecting member are coaxial and arranged along a second direction that is perpendicular to the first direction. The output shaft of the first motor is connected to the input component of the first speed reducer, and the output shaft of the second motor is connected to the input component of the second speed reducer.

14 Claims, 7 Drawing Sheets

(56) References Cited

U.S. PATENT DOCUMENTS

| | | | | |
|---|---|---|---|---|
| 5,783,915 | A * | 7/1998 | Shida | H02P 25/034 |
| | | | | 310/12.19 |
| 6,367,359 | B1 * | 4/2002 | Ropos | B23B 29/03467 |
| | | | | 82/1.4 |
| 6,382,044 | B1 * | 5/2002 | Reed | D21F 1/02 |
| | | | | 403/282 |
| 10,022,861 | B1 * | 7/2018 | He | B25J 19/0075 |
| 2004/0193318 | A1 * | 9/2004 | Ito | B25J 9/06 |
| | | | | 700/245 |
| 2009/0058208 | A1 * | 3/2009 | Kimura | H02K 5/1732 |
| | | | | 310/83 |
| 2010/0229670 | A1 * | 9/2010 | Nogami | B25J 9/10 |
| | | | | 74/490.01 |
| 2013/0074636 | A1 * | 3/2013 | Doi | B25J 9/1025 |
| | | | | 74/490.03 |
| 2017/0259436 | A1 * | 9/2017 | Nakayama | B25J 9/06 |
| 2017/0271947 | A1 * | 9/2017 | Ando | B65H 18/10 |
| 2017/0276197 | A1 * | 9/2017 | Yabusaki | F16D 55/226 |
| 2018/0275083 | A1 * | 9/2018 | Kiriyama | G01N 27/12 |
| 2018/0358702 | A1 * | 12/2018 | Lee | B25J 11/00 |

\* cited by examiner

SERVO ASSEMBLY, ROBOT JOINT AND ROBOT

CROSS REFERENCE TO RELATED APPLICATIONS

This application claims priority to Chinese Patent Application No. 201711365286.3, filed Dec. 18, 2017, which is hereby incorporated by reference herein as if set forth in its entirety.

BACKGROUND

1. Technical Field

The present disclosure generally relates to servos, and particularly to a servo that provides two degrees of freedom, a robot joint and a robot that include the servo.

2. Description of Related Art

A servo is a key component of some robots. In order to imitate human actions, it usually needs more degrees of freedom in some parts of the robot. For example, in order to rotate a robot arm forward and backward and raise the arm outward, it requires two servos at the corresponding robot shoulder. Many conventional robots use a second servo that is connected to the output of a first servo. With such configuration, the robot joints are large, which is not conducive to the miniaturization of the robots.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
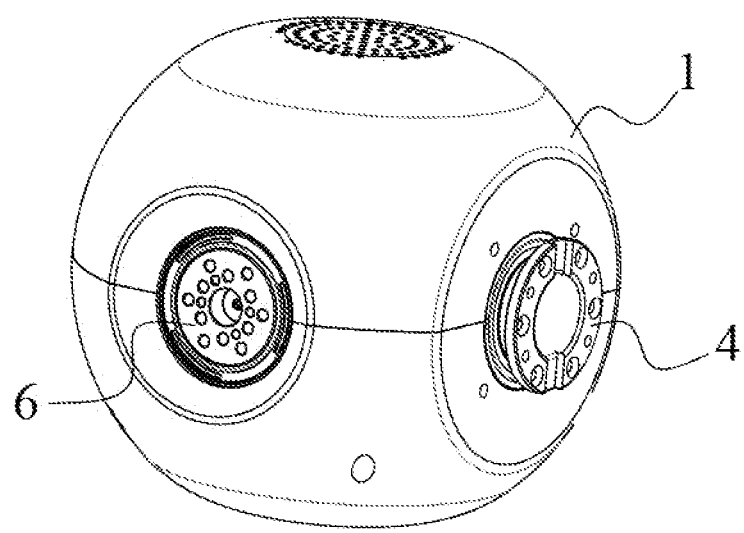
FIG. 1 is an isometric view of a servo assembly according to one embodiment.
Figure 2:
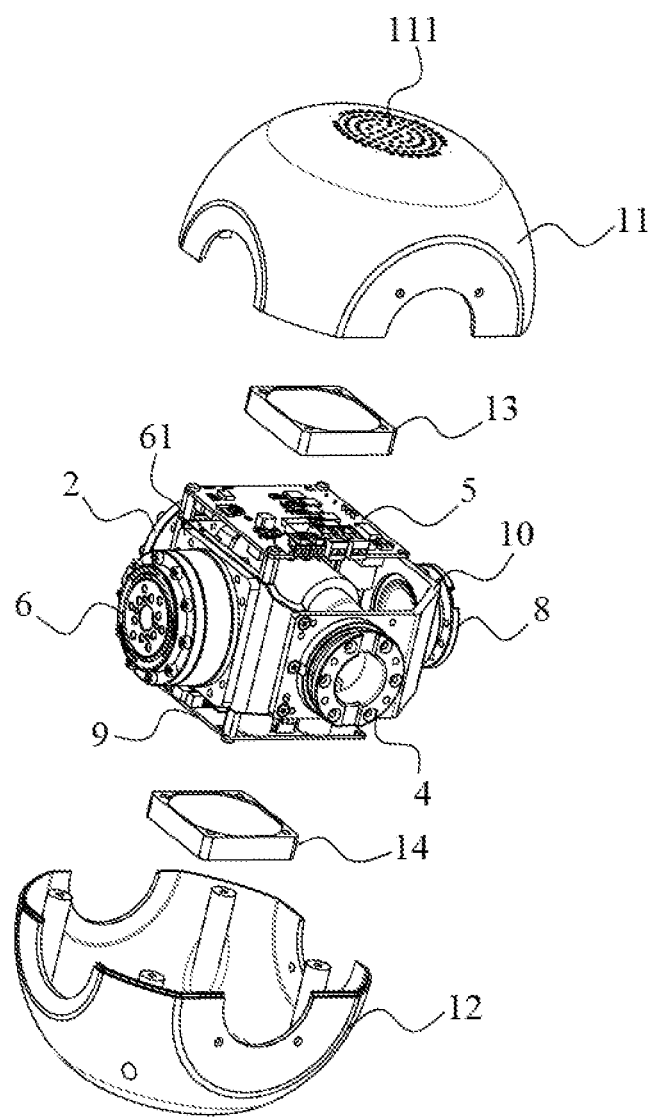
FIG. 2 is an isometric exploded view of the servo assembly of FIG. 1, viewed from a first perspective.
Figure 3:
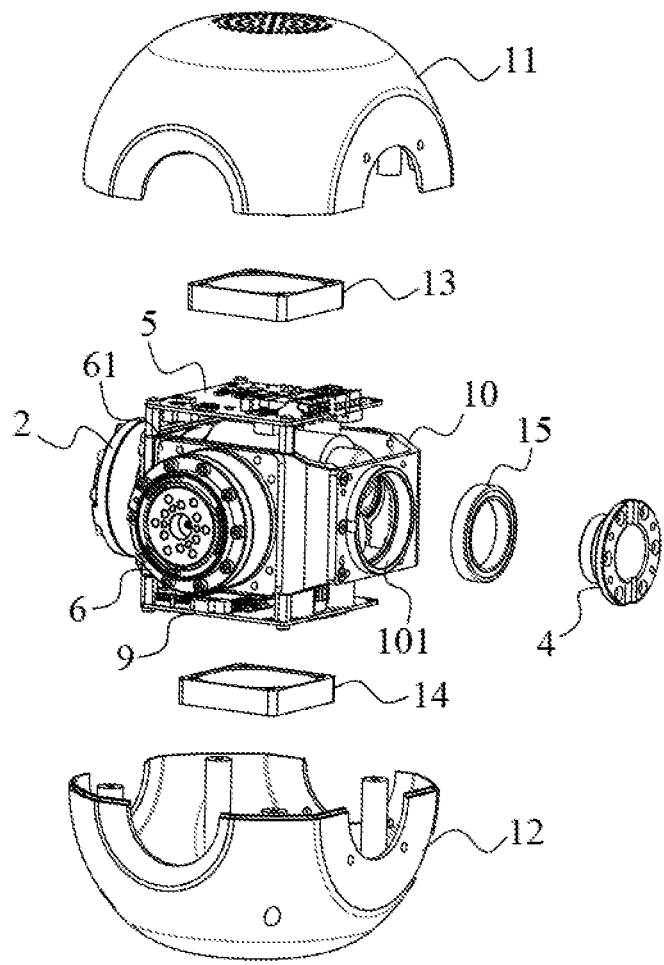
FIG. 3 is an isometric exploded view of the servo assembly of FIG. 1, viewed from a second perspective.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1-5, in one embodiment, a servo assembly includes a first speed reducer 2 having an input component and an output component, a first motor 3 including an output shaft, a first connecting member 4, a first control circuit board 5, a second speed reducer 6 having an input component and an output component, a second motor 7 including an output shaft, a second connecting member 8 and a second control circuit board 9. The first speed reducer 2, the first connecting member 4, the second speed reducer 6 and the second connecting member 5 are used to connect with external components. The first control circuit board 5 is electrically coupled to the first motor 3, and the second control circuit board 9 is electrically coupled to the second motor 7. The output component of the first speed reducer 2 and the first connecting member 4 are coaxial and arranged along a first direction. The output component of the second speed reducer 6 and the second connecting member 8 are coaxial and arranged along a second direction that is perpendicular to the first direction. The output shaft of the first motor 3 is connected to the input component of the first speed reducer 2, and the output shaft of the second motor 7 is connected to the input component of the second speed reducer 6. With such configuration, the servo assembly is able to provide two degrees of freedom, i.e., rotations around two axes respectively parallel to the first direction and the second direction. Further, the above configuration makes full use of the internal space of the servo assembly, enabling the servo assembly to be compact.

Figure 4:
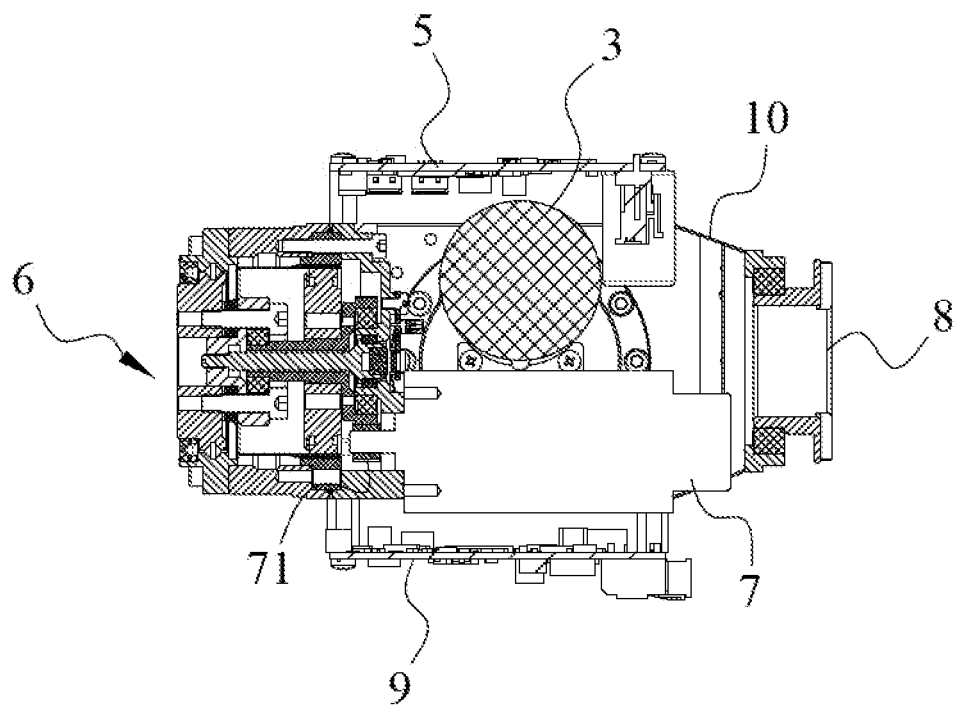
FIG. 4 is a planar sectional view of the servo assembly of FIG. 1.
Figure 5:
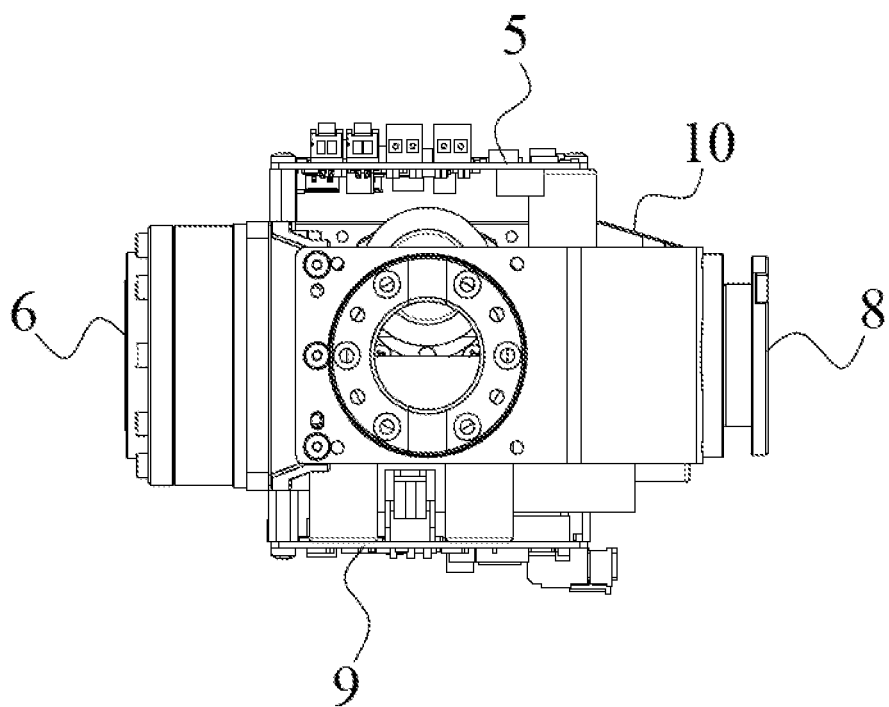
FIG. 5 is a planar view of the servo assembly of FIG. 1, with some components omitted for clarity.

Referring to FIG. 4, in one embodiment, the first speed reducer 2 and the second speed reducer 6 are both harmonic drives. The harmonic drives can be any suitable conventional harmonic drives and will not be described in detail herein. In the embodiment, the output portions of the first speed reducer 2 and the second speed reducer 6 each include a cross roller baring to reduce the size of the servo assembly, and improve the servo output stability. The output shafts of the first motor 3 and the second motor 7 each include a power gear 71 that meshes with a corresponding gear of the first speed reducer 2 and the second speed reducer 6 so as to drive them.

Referring again to FIGS. 2 and 3, in one embodiment, the servo assembly further includes a frame 10. Outer casings 61 of the first speed reducer 2 and the second speed reducer 6 are fixed to the frame 10, and the first connecting member 4 and the second connecting member 8 are connected to the frame 10. The outer casing 61 is connected to the bracket 10 and they serve as a support for the servo assembly. In the embodiment, the first control circuit board 5 and the second control circuit board 9 are respectively fixedly mounted on the lateral sides of the support by screws.

Referring again to FIG. 3, in one embodiment, the first connecting member 4 and the second connecting member 8 are both supporting flanges. The supporting flanges are hollow so as to allow cables to pass therethrough. In the embodiment, the first connecting member 4 and the second connecting member 8 each are connected to the frame 10 through a bearing 15. Specifically, the frame 10 defines two mounting holes 101 corresponding to the bearings 15. The two bearings 15 are respectively received in the two mounting holes 101 in an interference-fit manner, and the first connecting member 4 and the second connecting member 8 are connected to inner rings of the bearings 15 in an interference-fit manner.

Referring again to FIGS. 1 and 2, in one embodiment, the servo assembly further includes a housing 1. The first speed reducer 2, the first motor 3, the first connecting member 4, the first control circuit board 5, the second speed reducer 6, the second motor 7, the second connecting member 8 and the second control circuit board 9 are accommodated within the housing 1. The housing 1 defines two openings respectively corresponding to the first speed reducer 2 and the first connecting member 4, and two through holes respectively corresponding to the second speed reducer 6 and the second connecting member 8. The axes of the openings are perpendicular to the axes of the through holes. With such configuration, the first speed reducer 2, the first connecting member 4, the second speed reducer 6 and the second connecting member 8 can connect with external components. In the embodiment, the housing 1 is substantially spherical. However, the shape of the housing 1 is not limited and can be any suitable shapes according to need.

In one embodiment, the servo assembly further includes a first fan 13 and a second fan 14 for dissipating heat generated by the first motor 3, the first control circuit board 5, the second motor 7 and the second control circuit board 9. The housing 1 includes an upper housing 11 and a lower housing 12 that are connected to each other. The upper housing 11 and the lower housing 12 each define four semi-circular cut-outs. These semi-circular cut-outs cooperatively form the aforementioned openings and through holes. The first fan 13 is received in the upper housing 11 and electrically connected to the first control circuit board 5. The second fan 14 is received in the lower housing 12 and electrically connected to the second control circuit board 9. The first fan 13 is located under the first control circuit board 5, and the second fan 14 is located under the second control circuit board 9, so as to improve the heat dissipation effect of the first control circuit board 5 and the second control circuit board 9. The first control circuit board 5 is arranged at a side of the first motor 3 away from the second motor 7 and the second control circuit board 9 is arranged at a side of the second motor 7 away from the first motor 3.

Referring again to FIG. 2, in one embodiment, the upper housing 11 defines a plurality of first vent holes 111 in an area corresponding to the first fan 13, and the lower housing 12 defines a plurality of second vent holes (not shown) in an area corresponding to the second fan 14, so as to further improve the heat dissipation effect of the first control circuit board 5 and the second control circuit board 9. In the embodiment, the first vent holes 111 and the second vent holes may be a plurality of small holes arranged in a regular pattern, and the coverage areas of the first vent holes 111 and the second vent holes are substantially the same as the cross-sectional areas of the first fan 13 and the second fan 14.

Figure 6:
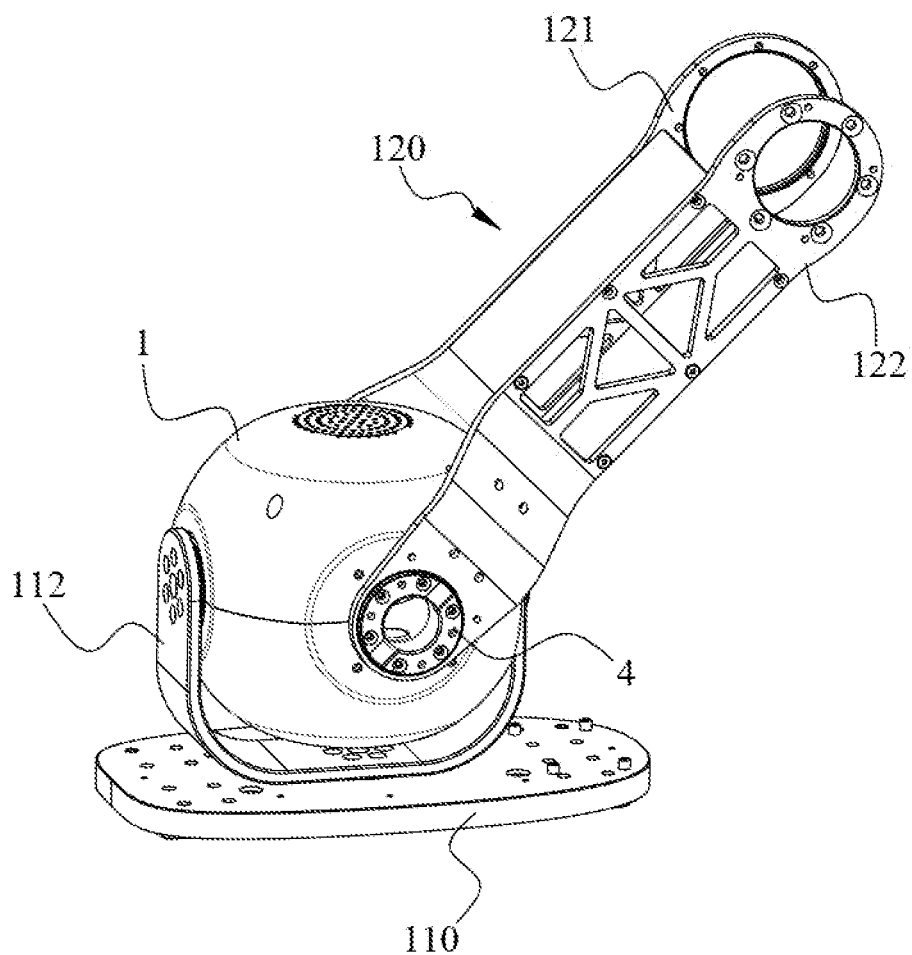
FIG. 6 is an isometric view of a robot joint according to one embodiment.
Figure 7:
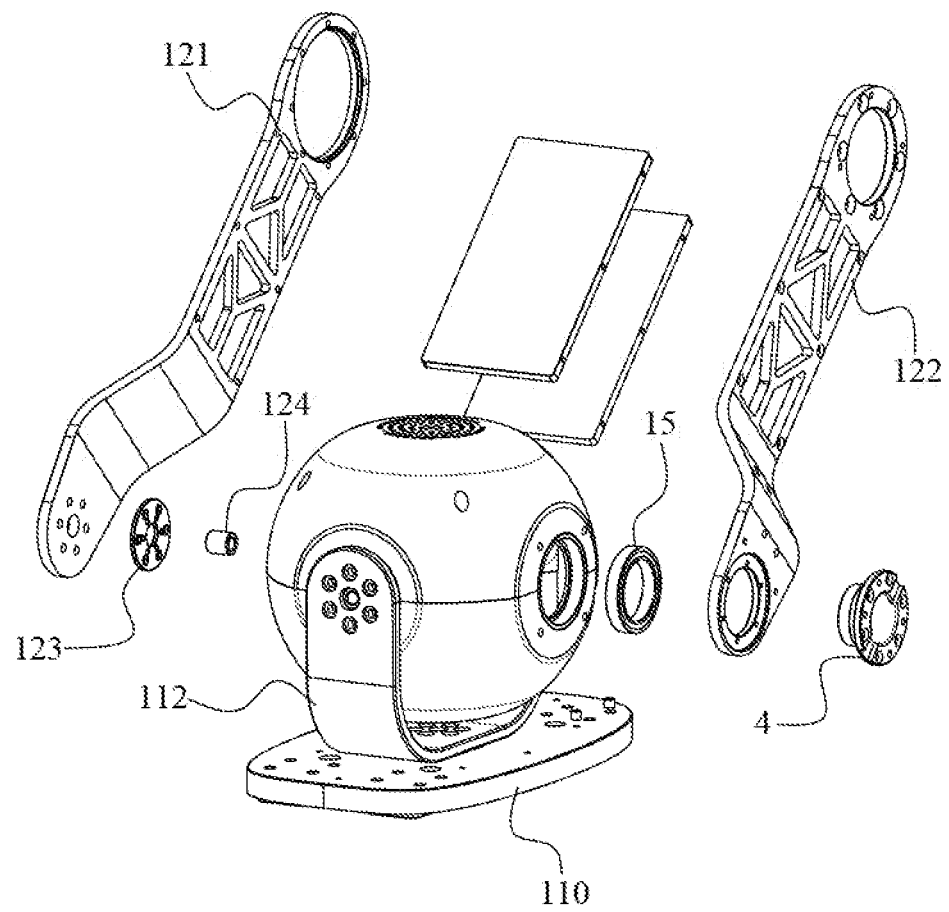
FIG. 7 is an isometric exploded view of the robot joint of FIG. 6.

Referring to FIGS. 6 and 7, in one embodiment, a robot joint assembly includes the aforementioned servo assembly, a first joint member and a second joint member that are connected to the servo assembly. The first speed reducer 2 and the first connecting member 4 are connected to the first joint member, and the second speed reducer 6 and the second connecting member 8 are connected to the second joint member. With such configuration, the first joint member is rotatable around an axis that extends along the first direction, and the second joint member is rotatable around an axis that extends along the second direction.

In the embodiment, the servo assembly is applied to a robot's ankle. The first joint member serves as a leg 120, and the second joint member serves as a foot 110. The second speed reducer 6 and the second connecting member 8 are connected to the foot 110 through a third connecting member 112 which is substantially U-shaped. The two opposite ends of the U-shaped third connecting member 112 are respectively connected with the second speed reducer 6 and the second connecting member 8, and the middle portion of the U-shaped third connecting member 112 is connected with the foot 110. The first speed reducer 2 and the first connecting member 4 are connected to the leg 120. Specifically, the leg 120 includes a first leg structure 121 and a second leg structure 122 that are disposed opposite to each other. The first connecting member 4 passes through a through hole of the second leg structure 122, and is connected to the inner ring of the bearing 15 in an interference-fit manner. The first connecting member 4 is connected to the second leg structure 122 by screws. On the opposite side, the first leg structure 121 is attached to the output shaft of the harmonic drive through a spacer 123 and a pin 124. The pin 124 is mounted in the center hole of the output crossed roller bearing in a clearance-fit manner.

It can be understood that, in other embodiments, the servo assembly may also be applied to other structures such as a robot hip joint. In this case, the first joint member may serve as a thigh and the second joint member may serve as a waist. The first speed reducer 2 and the first connecting member 4 are connected to the thigh, and the second speed reducer 6 and the second connecting member 8 are connected to the waist, thereby allowing the thigh to be rotatable around two perpendicular axes so as to imitate the flexion/extension and internal/external lateral rotation of a human thigh.

The present disclosure further provides a robot including the aforementioned servo assembly.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo assembly, comprising:
a first speed reducer comprising an input component and an output component, a first motor comprising an output shaft, a first connecting member, a first control circuit board, a second speed reducer comprising an input component and an output component, a second motor comprising an output shaft, a second connecting member, a second control circuit board, a housing comprising an upper housing and a lower housing that are connected to each other, a first fan and a second fan;
the first control circuit board being electrically coupled to the first motor, and the second control circuit board being electrically coupled to the second motor,
the output component of the first speed reducer and the first connecting member being coaxial and arranged along a first direction, and the output component of the second speed reducer and the second connecting member being coaxial and arranged along a second direction that is perpendicular to the first direction;
the output shaft of the first motor being connected to the input component of the first speed reducer, and the output shaft of the second motor being connected to the input component of the second speed reducer;

the first speed reducer, the first motor, the first connecting member, the first control circuit board, the second speed reducer, the second motor, the second connecting member and the second control circuit board are accommodated within the housing; and the first fan is received in the upper housing and electrically connected to the first control circuit board, the second fan is received in the lower housing and electrically connected to the second control circuit hoard.

2. The servo assembly of claim 1, wherein the first speed reducer and the second speed reducer are harmonic drives.

3. The servo assembly of claim 2, further comprising a frame, wherein the first speed reducer and the second speed reducer are fixed to the frame, and the first connecting member and the second connecting member are connected to the frame.

4. The servo assembly of claim 3, wherein the first connecting member and the second connecting member each are connected to the frame through a bearing.

5. The servo assembly of claim 4, wherein the frame defines two mounting holes corresponding to the bearings, the two bearings are respectively received in the two mounting holes in an interference-fit manner, and the first connecting member and the second connecting member are connected to inner rings of the bearings in an interference-fit manner.

6. The servo assembly of claim 1, wherein the housing defines two openings respectively corresponding to the first speed reducer and the first connecting member, and two through holes respectively corresponding to the second speed reducer and the second connecting member, axes of the openings are perpendicular to axes of the through holes.

7. The servo assembly of claim 6, the first control circuit board is arranged at a side of the first motor away from the second motor and the second control circuit board is arranged at a side of the second motor away from the first motor.

8. The servo assembly of claim 7, wherein the upper housing defines a plurality of first vent holes in an area corresponding to the first fan, and the lower housing defines a plurality of second vent holes in an area corresponding to the second fan.

9. A robot joint assembly comprising a servo assembly, a first joint member and a second joint member that are connected to the servo assembly;

the servo assembly comprising:

a first speed reducer comprising an input component and an output component, a first motor comprising an output shaft, a first connecting member, a first control circuit board, a second speed reducer comprising an input component and an output component, a second motor comprising an output shaft, a second connecting member, a second control circuit board, a housing comprising an upper housing and a lower housing that are connected to each other, a first fan and a second fan;

the first control circuit hoard being electrically coupled to the first motor, and the second control circuit hoard being electrically coupled to the second motor, the output component of the first speed reducer and the first connecting member being coaxial and arranged along a first direction, and the output component of the second speed reducer and the second connecting member being coaxial and arranged along a second direction that is perpendicular to the first direction; and the output shaft of the first motor being connected to the input component of the first speed reducer, and the output shaft of the second motor being connected to the input component of the second speed reducer;

the first speed reducer, the first motor, the first connecting member, the first control circuit board, the second speed reducer, the second motor, the second connecting member and the second control circuit board are accommodated within the housing;

the first fan is received in the upper housing and electrically connected to the first control circuit board, the second fan is received in the lower housing and electrically connected to the second control circuit board;

the first speed reducer and the first connecting member are connected to the first joint member; and the second speed reducer and the second connecting member are connected to the second joint member.

10. A robot comprising a servo assembly; the servo assembly comprising:

a first speed reducer comprising an input component and an output component, a first motor comprising an output shaft, a first connecting member, a first control circuit board, a second speed reducer comprising an input component and an output component, a second motor comprising an output shaft, a second connecting member, a second control circuit board, a housing comprising an upper housing and a lower housing that are connected to each other, a first fan and a second fan;

the first control circuit board being electrically coupled to the first motor, and the second control circuit hoard being electrically coupled to the second motor, the output component of the first speed reducer and the first connecting member being coaxial and arranged along a first direction, and the output component of the second speed reducer and the second connecting member being coaxial and arranged along a second direction that is perpendicular to the first direction;

the output shaft of the first motor being connected to the input component of the first speed reducer, and the output shaft of the second motor being connected to the input component of the second speed reducer;

the first speed reducer, the first motor, the first connecting member, the first control circuit board, the second speed reducer, the second motor, the second connecting member and the second control circuit board are accommodated within the housing; and the first fan is received in the upper housing and electrically connected to the first control circuit board, the second fan is received in the lower housing and electrically connected to the second control circuit board.

11. The servo assembly of claim 1, wherein the first connecting member is arranged at a side of the first motor away from the output shaft of the first motor, and the second connecting member is arranged at a side of the second motor away from the output shaft of the second motor.

12. The servo assembly of claim 1, wherein the first connecting member and the first speed reducer are arranged at two opposing sides of the first motor, respectively, and the second connecting member and the second speed reducer are arranged at two opposing sides of the second motor; respectively.

13. The servo assembly of claim 3, wherein the frame has a cubic shape, first connecting member and the first speed reducer are arranged at a first two opposing sides of the frame, respectively, and the second connecting member and the second speed reducer are arranged at a second two opposing sides of the frame, respectively, the first control circuit board and the second control circuit board are arranged at a third two opposing sides of the frame.

14. The servo assembly of claim 13, wherein the frame defines two mounting holes corresponding to the bearings, the two bearings are respectively received in the two mounting holes in an interference-fit manner, and the first connecting member and the second connecting member are connected to inner rings of the bearings in an interference-fit manner.

* * * * *